(12) United States Patent
Smith et al.

(10) Patent No.: US 11,497,220 B2
(45) Date of Patent: Nov. 15, 2022

(54) APPARATUS AND METHOD FOR FIXING AND TRANSPORTING CRABS DURING SLAUGHTER

(71) Applicant: Nordischer Maschinenbau Rud. Baader GmbH + Co. KG, Lübeck (DE)

(72) Inventors: Clinton R. Smith, Auburn, WA (US); Tyler Santoro, Kansas City, KS (US)

(73) Assignee: Baader North America Corporation, Auburn, WA (US)

( * ) Notice: Subject to any disclaimer, the term of this patent is extended or adjusted under 35 U.S.C. 154(b) by 72 days.

(21) Appl. No.: 17/189,360

(22) Filed: Mar. 2, 2021

(65) Prior Publication Data
US 2021/0274794 A1    Sep. 9, 2021

Related U.S. Application Data

(60) Provisional application No. 62/984,947, filed on Mar. 4, 2020.

(51) Int. Cl.
*A22B 7/00* (2006.01)
*A22C 29/02* (2006.01)

(52) U.S. Cl.
CPC ............ *A22B 7/003* (2013.01); *A22C 29/023* (2013.01)

(58) Field of Classification Search
CPC .............................. A22B 7/003; A22B 29/023
USPC ........................................................ 452/53, 1
See application file for complete search history.

(56) References Cited

U.S. PATENT DOCUMENTS

| | | |
|---|---|---|
| 3,274,640 A | 9/1966 | Rossnan |
| 4,829,636 A | 5/1989 | Caroon |
| 5,401,207 A * | 3/1995 | Hicks .................. A22C 29/023 83/425.2 |
| 2017/0273321 A1 | 9/2017 | Courage et al. |
| 2019/0029278 A1 * | 1/2019 | Fogarty ................ A22C 29/023 |

\* cited by examiner

*Primary Examiner* — Richard T Price, Jr.
(74) *Attorney, Agent, or Firm* — Dinsmore & Shohl LLP

(57) ABSTRACT

An apparatus for fixing and transporting crabs during slaughter has a rotationally driven conveying element guided about deflection and/or drive elements to form an upper and lower run, and at least one holding apparatus for fixing the crabs. Each holding apparatus is attached to the conveying element for transporting the fixed crabs in a transport plane along a transport path in a transport direction from a loading station to at least one processing station. Each holding apparatus has a supporting plate for receiving a crab and at least two holding means arranged transversely to the transport direction at a distance from each other. The holding means are pivotable relative to the supporting plate about an axis $A_H$, lying substantially in or parallel to the transport plane and directed transversely to the transport direction, from a receiving position into a clamping position and back. A corresponding method is also provided.

27 Claims, 12 Drawing Sheets

APPARATUS AND METHOD FOR FIXING AND TRANSPORTING CRABS DURING SLAUGHTER

CROSS REFERENCE TO RELATED APPLICATIONS

This application claims priority to U.S. Provisional Patent Application No. 62/984,947, filed Mar. 4, 2020 and entitled "APPARATUS AND METHOD FOR FIXING AND TRANSPORTING CRABS DURING SLAUGHTER" the entire contents of which is hereby incorporated by reference in its entirety, including the drawings thereof.

FIELD OF THE INVENTION

The present invention relates general to apparatus and methods for fixing and transporting crabs during slaughter

BACKGROUND OF THE INVENTION

The processing of crabs is typically a manual process requiring a plurality of steps. The process is often inefficient. The known apparatuses and methods for butchering crabs have the disadvantage that they achieve only limited efficacy and yield in recovering meat. There remains a need for improved apparatus and methods.

SUMMARY OF THE INVENTION

The invention relates to an apparatus, designed and configured for fixing and transporting crabs during the slaughter thereof, comprising a rotationally driven conveying element, which is guided about deflection and/or drive elements to form an upper run and a lower run, and at least one holding apparatus for fixing the crabs during slaughter, wherein each holding apparatus is attached to the conveying element for transporting the fixed crabs in a transport plane E and along a transport path in transport direction T from a loading station to at least one processing station and each holding apparatus comprises a supporting plate for receiving a crab to be slaughtered as well as at least two holding means arranged at a distance from each other transversely to the transport direction T, which, for fixing the crab in the region of legs on both sides of a dorsal shell of the crab, are designed to be pivotable relative to the supporting plate about an axis $A_H$, lying substantially in or parallel to the transport plane E and directed transversely to the transport direction T, from a receiving position into a clamping position and back.

The invention further relates to a method for fixing and transporting crabs during the slaughter thereof, comprising the steps: rotational driving of a conveying element with at least one holding apparatus, loading of the holding apparatus with a crab in the region of a loading station, the crab for loading of the holding apparatus being pushed onto a supporting plate of the holding apparatus with a bone plate of the crab downwards, mouth forwards and legs projecting laterally in transport direction T of the conveying element, and the crab is then fixed on the supporting plate on both sides of the shell in the region of the legs by lowering two holding means of the holding apparatus, which are arranged transversely to the transport direction T at a distance from each other, by pivoting from a receiving position of the holding means into a clamping position about an axis $A_H$ directed substantially in or parallel to the transport plane and transversely to the transport direction T, the crab thus fixed being transported further into the region of at least one processing station.

Such apparatuses and methods are used during the slaughter of crabs. The devices taken on their own may be used, for example, as a retrofit kit for existing crab slaughter apparatuses or the like. However, the generic apparatuses for fixing and transporting are usually part of a crab slaughter apparatus in which a loading station and at least one processing station are arranged along the generic apparatus for fixing and transporting the crabs. The crabs themselves have a central body mass which is located between a dorsal, upper portion, which is also referred to as the top shell or shell, and a ventral, lower portion, which is also referred to as the bone plate. The front end of the crab which leads during transport of the crabs in transport direction T during the slaughter process comprises a mouth under which mandibles are located. Viewed in transport direction T, legs extend laterally from the body mass on both sides and are articulated at the body mass in the region of shoulder joints. In other words, every crab has a carcass, i.e. a kind of basic body, with the main body mass containing the internal organs, on both sides of which body mass the legs are arranged, each of which may consist of a plurality of members connected to each other in an articulated manner. The shell is arranged on the upper side, referred to as the back. The bone plate is arranged on the underside, referred to as the belly. Shell and bone plate protect the central body mass.

The apparatus and the method are designed and configured for the slaughter of crabs of different species. These crabs differ not only in their size but also, among other things, with regard to the formation of the shell. Typically, in a view of the crab from above, the shell at least partially covers the transition region where the legs meet the body mass, i.e. the region of the shoulder joints. The crabs may also differ in their natural posture, for example, depending on how flexible the legs are in the region of the shoulder joints and/or in the region of the joints connecting the individual members of the leg. In crabs with comparatively rigid joints, for example, the legs stand out laterally from the body mass relatively stiffly. In crabs with comparatively soft joints, the legs may hang down slightly from the body mass or be inherently bent.

During slaughter, the crabs are placed with their bone plate, i.e. ventrally, on the supporting plate. In known apparatuses, the supporting plate is substantially flat and firmly connected to the conveying element such that the supporting plate is rotationally driven with the conveying element. Every supporting plate is associated with two holding means to form a holding apparatus, said holding means being designed to be pivotable about the $A_H$ axis, lying substantially in or parallel to the transport plane E and directed transversely to the transport direction T, from the receiving position, in which the holding means are opened up and release the supporting plate for the insertion/placement of a crab, into the clamping position, in which the holding means fix the legs between themselves and the supporting plate. The holding means can be controlled into the receiving position, at least in the region of the loading station. After manually or automatically inserting a crab onto the supporting plate, the holding means can be controlled singly or together and preferably synchronously into the clamping position such that a holding force directed substantially vertically in the direction of the conveying plane is applied to the legs by the holding means. In this fixed position, the crabs are fed to at least one processing station downstream of the loading station in transport direction T, wherein forces and movements of the slaughter tools act on the crabs during slaughter, said forces and movements at least partially counteracting the holding forces of the holding means.

The known apparatuses and methods have a number of disadvantages. On the one hand, the known apparatuses and methods can only be used in each case for a very limited number of crab species, as the holding apparatuses and in particular the holding means are limited in the receiving and fixing of crabs of different sizes/dimensions. Furthermore, the flat supporting plate means that ultimately only crabs with flat legs in their natural posture, i.e. legs with little flexion in their natural posture, can be processed, since crabs of other species with a more curved leg posture in their natural posture are difficult to position or cannot be positioned at all on the supporting plate. The flat supporting plate also makes it difficult to position the crabs centrally and symmetrically on the supporting plate. Finally, the operator has to hold every crab in the centred and symmetrical position until the holding means fix the crab in their clamping position. On the other hand, the crab shells, which project over the body mass and in particular the shoulder joints, make it difficult to fix the legs close to the shoulder joints as the holding means can only lower onto the legs from the receiving position into the clamping position adjacent to the shell. This fixes the legs at a distance from the shoulder joints which results in reduced stability when fixing the crabs. Furthermore, the holding forces of the holding means are not sufficient in some cases to reliably fix the crabs in the holding apparatus during the slaughter process. In other words, there is a risk that the forces, torques, impacts, upstrokes or the like, which act on the crabs during slaughter due to the slaughter tools, will cause the holding means to open or at least loosen them. As a result, the disadvantages of insufficient centring, positioning and fixing of the crabs on/in the holding apparatus mentioned with respect to known apparatuses and methods lead to an unsatisfactory slaughter result.

Thus, the object of the invention is to create an apparatus that can be universally used for crabs of different species which ensures easy and secure positioning, centring and fixing of the crabs to improve the slaughter result. The object of the invention is also to propose a corresponding method.

This object is achieved by an apparatus of the type referred to hereinbefore in that both holding means are designed to be movable, in addition to the pivoting movement about the axis $A_H$, towards and away from each other transversely to the transport direction T to vary their distance. The at least one additional degree of freedom of the holding means which can be achieved, for example, by a linear movement and/or a pivoting movement of the holding means, ensures improved centring and positioning of the crab on the supporting plate. The fact that the holding means are designed to be movable laterally towards the crab and away from it, in addition to the movement directed substantially vertically towards the crab, ensures easy and reliable processing of different species which differ particularly in size. Especially advantageously, the additional degree of freedom allows access of the holding means under the shell, in such a manner that the holding means fix the legs in the region of the shoulder joints, i.e. close to the body mass, in a direction vertical to the conveying plane and the supporting plate, thus, on the one hand, improving centring and positioning of the crabs on the supporting plate and, on the other hand, fixing the crabs against the supporting plate. On the one hand, the movements of the holding means about the axis $A_H$ can preferably be at least partially superimposed for a movement directed substantially vertically to the conveying plane E and the movement directed substantially transversely to the transport direction T, thus further optimising the loading process and the fixing process in that the holding means ultimately clamp each crab from two directions.

Advantageously, with regard to their respective pivot position about the axis $A_H$, both holding means are positively controlled, at least in sections, along the transport path by means of at least one roller associated with the holding means and a corresponding cam track. This mechanical solution to controlling the holding means ensures easy and secure fixing and ultimately also release of the crabs in the or from the holding apparatus. For this purpose, the cam track is arranged at least in the region of the loading station and possibly an unloading station. Due to the cam track, the at least one roller associated with the holding means, other guide bodies can also be used, is positively guided in such a manner that the holding means pivot about the axis $A_H$ to vary their position. However, pivoting of the holding means from the receiving position into the clamping position and vice versa can also be carried out in other ways, e.g. by means of pneumatic cylinders, servomotors or the like.

An especially preferred development of the apparatus is characterised in that both holding means are designed to be pivotable about an axis $A_V$ which is directed substantially vertically to the transport plane E in the clamping position, from a closing position into a loading position and back. The term "substantially vertically" describes an orientation which also includes a slight inclination of a few degrees to the vertical. The substantially vertical orientation of the axis $A_V$ to the transport plane E relates to the clamping position of the holding means. In the receiving position, that is when loading the holding apparatus with a crab in the loading station, the axis $A_V$ may also be briefly oriented at an angle deviating from the vertical by more than the few degrees. In this position, the axis $A_V$ is substantially perpendicular to the plane $E_H$ which is defined by the holding means. Ultimately, the crab is held between the sides of the holding means that are facing each other. In the closing position, the sides of the holding means that are facing each other rest on the crab, preferably in the region of the shoulder joints underneath the shell, to centre and hold the crab. In the loading position, the distance between the sides of the holding means that are facing each other is temporarily enlarged transversely to the transport direction T to make it easier to load and position the crab on the supporting plate.

Advantageously, both holding means are held in the closing position by means of a spring element and are designed to be deflectable into the loading position about the substantially vertically directed axes $A_V$ against the spring force of the spring elements. The fact that the holding means are basically held in the closing position by the spring element already ensures a kind of pre-fixing, which keeps the crab in a centred position, even when loading and positioning the crabs on the supporting plate. The crab itself virtually pushes the holding means open such that there is already a centring and fixing contact between holding means and crab at the beginning of the loading process. Furthermore, the spring elements allow adaptation to crabs of different sizes. In other words, providing the spring elements ensures that the holding apparatus can be used to securely and reliably position and centre crabs of different species and in particular of different sizes.

Both holding means preferably have a contour on their inner sides facing each other which is adapted, at least in sections, to the body shape of the crabs. This design ensures that the crabs are securely centred and positioned by the holding means, as the crabs are held in a form-fitting manner, at least in sections, by pivoting the holding means about the axis $A_V$ even before the actual fixing, which ultimately takes place by pivoting the holding means about the axis $A_H$.

Advantageously, the holding means are plate-shaped fixing elements, the inner edges of which, facing each other and spaced apart, are at least partially concave. The concave design of at least sections of the inner edges forms a curved line of contact with the convex contours of the crabs which encompasses the crab to be fixed in the region of the body mass and underneath the shell. The plane defined by the plate-shaped fixing elements runs, with respect to the clamping position, substantially parallel to the transport plane E. The radius profile of the inner edges supports precise positioning of the crabs forwards and backwards, i.e. in the transport direction and counter to the transport direction, on the supporting plate or of the legs between holding means and supporting plate.

An advantageous embodiment of the apparatus is characterised in that the position of the holding means relative to each other in the transport plane E or parallel thereto in the closing position is designed to be adjustable, i.e. in particular the gap between the holding means transversely to the transport direction T in the closing position. In other words, the concave recesses of the fixing elements in the closing position form a kind of receiving ring or receiving trough for the (body mass of the) crabs. Due to the advantageous embodiment, the size of the receiving trough can be variably adjusted.

The adjustability of the position of the holding means in relation to each other transversely to the transport direction T in the closing position can be implemented, for example, mechanically and/or pneumatically and/or by a motor.

Expediently, both holding means are designed in each case to be bevelled on an entry-side end of the crabs into the holding apparatus in such a manner that the two spaced-apart holding means together form a guidance aid which converges in transport direction T when the crabs are inserted into the holding apparatus. The inner edges of the two holding means that are facing each other extend from a front edge of the holding means that is directed transversely to the transport direction T towards an imaginary central axis M of the apparatus, running in each case into the concave portion of the inner edges of the holding means, and subsequently end linearly to the concave portion, i.e. substantially parallel to the central axis M, in transport direction T. This simplifies and improves positioning and centring of the crabs on the supporting plate, as the contour of the inner edges and the receiving trough creates a kind of locking position for the crab due to its convex shape, in which position the crab is held in position in transport direction T and transversely to transport direction T. As a result, forces which act on the crab during the slaughter process, particularly when removing the shell, can be absorbed safely and reliably so that displacement of the crab on the supporting plate or in the holding apparatus can be effectively prevented or at least reduced during the slaughter process.

In an especially preferred development of the apparatus, the supporting plate is adapted regarding its shape to the natural position of the crabs to be fixed, in such a manner that, starting from a supporting surface which, for supporting a ventral bone plate of the crab, preferably lies substantially in the transport plane E or parallel thereto, the supporting plate is designed to slope downwards at least in sections towards the sides with lateral supporting surfaces for supporting legs of the crab and/or towards the front for introducing the crab between the supporting plate and the holding means contrary to the transport direction T. This means that even crabs whose species do not allow them to be placed on a continuously flat surface of the supporting plate, e.g. due to a curved leg position in their natural posture, can be processed with the apparatus according to the invention. With the preferred development of the shaping of the supporting plate, with at least partially sloping supporting surface, it is possible to provide maximum support even for such crabs, i.e. also in the region of the legs, in order to bring them into the desired position for fixing.

Preferably, each holding apparatus is connected to the conveying element by means of a fastening unit, the fastening unit being connected firmly and immovably relative to the conveying element but being connected rotationally to said conveying element. This "decoupling" of the holding apparatus from the conveying element means that the holding apparatus can be better and more precisely brought into the receiving position, on one hand, and into the clamping position, on the other hand, for positioning. In other words, loosening the rigid connection between supporting plate and conveying element supports the loading process and the fixing process.

Advantageously, the supporting plate and the holding means are pivotably mounted on the fastening unit. The mounting of the supporting plate is designed to be independent of the mounting of the holding means. This creates additional degrees of freedom which simplify and improve loading and fixing of the crabs.

A preferred embodiment of the apparatus is characterised in that both the supporting plate and both holding means are mounted on a pivot device, the pivot device being designed to be pivotable relative to the conveying element about an axis $A_{H1}$, lying substantially in or parallel to the transport plane E and directed transversely to the transport direction T, from a receiving position into a clamping position and back. The axis $A_{H1}$ therefore corresponds to the axis $A_H$, as pivoting about this axis results in the holding means being movable substantially perpendicular to the crab to be fixed. In other words, the pivot axis $A_{H1}$ enables lowering of the holding means to fix the legs of the crab and opening of the holding means to release the legs of the crab.

Advantageously, the pivot device is associated with at least one roller which is guided at least in sections along a cam track along the transport path, in such a manner that the pivot device is pivotable about the axis $A_{H1}$ from the clamping position into the receiving position and back in the region of the loading station against the spring force of spring elements which are tensioned between the pivot device and the fastening unit, in such a manner that the pivot device is basically held in the clamping position against an abutment. Due to the cam track, the at least one roller associated with the holding means, other guide bodies can also be used, is positively guided in such a manner that the holding means pivot about the axis $A_{H1}$ to vary their position. However, pivoting of the holding means from the receiving position into the clamping position and vice versa can also be carried out in other ways, e.g. by means of pneumatic cylinders, servomotors or the like.

Especially preferably, the supporting plate is mounted on the pivot device so as to be pivotable about an axis $A_{H2}$, which is directed parallel to the axis $A_{H1}$, in such a manner that the supporting plate is designed to be pivotable relative to the pivot device and relative to the holding means. As a result of this, there is a loose coupling between the supporting plate and the holding means via the pivot device which simplifies loading of the holding apparatus. When pivoting the holding means into the receiving position about the axis $A_{H1}$, the supporting plate is also raised into a position in which loading the holding apparatus with a crab is simplified. The fact that the supporting plate is pivotably mounted about the axis $A_{H2}$ in addition to and independently of the holding means changes the position of the supporting plate relative to the holding means. In other words, the supporting plate drops downwards with respect to the holding means or the holding means pivot upwards with respect to the supporting plate, resulting in an increased distance between supporting plate and holding means. This improves accessibility for loading the holding apparatus with a crab.

Preferably, the holding means are each mounted on a carrier element so as to be pivotable about the axis $A_V$, the carrier elements being firmly connected to the pivot device and being pivotable therewith about the axis $A_{H1}$. As a result, the carrier elements and therefore also the holding means follow the movement of the pivot device about the axis $A_{H1}$, for example via the roller and the corresponding cam track, while the supporting plate on the one hand follows the movement of the pivot device about the axis $A_{H1}$ and on the other hand performs an opposing pivoting movement about the axis $A_{H2}$, for example solely due to gravity. Due to the pivotable mounting of the holding means about the axis $A_V$ on the carrier element, the pivoting movements of the holding means can be superimposed in the vertical direction about the axis $A_{H1}$ and transversely to the transport direction T about the axis $A_V$.

Advantageously, the minimum distance in the clamping position between the holding means on the one hand and the supporting plate on the other hand is limited vertically to the transport plane E by an abutment. The minimum distance is set so that on the one hand the crab is firmly fixed in the clamping position and on the other hand it is not injured. For this purpose, the abutment, for example a simple screw arrangement, is adjustable with regard to its position.

As described, the holding means are arranged on a pivot device. This pivot device may be formed in one piece, in such a manner that the holding means are coupled together via the pivot device. An especially preferred development of the apparatus is characterised in that the pivot device comprises two pivot arms, each of which is mounted separately on the fastening unit so as to be pivotable about the axis $A_{H1}$, the supporting plate being mounted on both pivot arms so as to be pivotable about the axis $A_{H2}$ and arranged on each pivot arm is a holding means which on the one hand is mounted on a carrier element, which is fastened to the pivot arm, so as to be pivotable about the axis $A_V$ and on the other hand is pivotable with the pivot arm about the axis $A_{H1}$. This ensures individual control, in particular an individual pivoting movement of the holding means relative to the supporting plate.

Advantageously, each pivot arm is held in the clamping position via a spring element, which is arranged with one end on the pivot arm and with the opposing end on the fastening unit, and each pivot arm has a roller which is guided along a separate cam track for positive control of the pivot arms, at least in sections, and thus at least also of the holding means. This further supports individual control.

Advantageously, two cam tracks are provided which extend in transport direction T at least in the region of the loading station and are designed and configured in such a manner that each pivot arm in the loading station is pivoted from the clamping position into the receiving position against the spring force of the spring element, and which cam tracks preferably extend into the region of the or each processing station and are designed and configured in such a manner that the pivot arms are forcibly held in the clamping position to support the spring force in the region of the processing stations. On the one hand this optimises loading and on the other hand it improves secure fixing.

A preferred development is characterised in that means for holding the holding means in the closing position are arranged along the conveying element, preferably in the region of the or each processing station. These means prevent the holding means from pivoting away sideways, for example due to force exerted during processing. In other words, the means form a kind of lateral positive guidance for the holding means, at least during processing, which holds the holding means in the closing position.

The object is also achieved by a method with the steps referred to at the outset, in that the holding means, before reaching the final clamping position, in which the holding means are, however, lower than the shell of the crab, are moved towards each other transversely to the transport direction T underneath the shell until the holding elements rest on a body mass of the crab on both sides in the region of the shoulder joints, before the holding means are then lowered completely into the final clamping position about the axis $A_H$.

Advantageously, the crab is pushed into a gap formed between holding means located in the receiving position and supporting plate, in such a manner that the crab lies with its bone plate on the supporting plate and with its shell above the holding means, wherein the crab with its body mass pushes open spring-loaded holding means transversely to the transport direction T about an axis $A_V$ which in the clamping position is directed substantially vertically to the transport plane E, such that, even before final fixing, the crab is centred and fixed laterally by the holding means before said holding means are pivoted towards the supporting plate into the final clamping position. In the receiving position itself of the holding means, the axis $A_V$ is oriented substantially perpendicular to a plane $E_H$ which is defined by the holding means.

A preferred development is characterised in that both the supporting plate and the holding means in the loading station are pivoted during loading from a clamping position into a receiving position relative to the conveying element about the axis $A_{H1}$ directed in or parallel to the transport plane and transversely to the transport direction T to form a sufficiently large gap, the supporting plate being additionally pivoted relative to the holding means about an axis $A_{H2}$, which is oriented parallel to the axis $A_{H1}$, to enlarge the gap.

Preferably, the holding means, on leaving the loading station at the latest, are necessarily pulled into the final clamping position by spring force and/or a control curve, as a result of which the holding means together with the supporting plate are pushed around the axes $A_{H1}$ and $A_{H2}$ in the direction of the conveying element, while the holding means are pushed towards each other by means of spring force about the axis $A_V$ in the direction of the crab.

Preferably, the holding means are held laterally in a closing position, at least in the region of the or each processing station, by means for holding the holding means. High forces act on the crab, particularly during processing. Due to the lateral holding, the holding means are prevented from pivoting about the axis $A_V$. Simply put, the means form an obstacle or a barrier which prevents the holding means from yielding and thus prevents loosening of the fixation.

Expediently, the crab is released from the holding apparatus after the last processing station.

Especially preferably, the method is carried out using an apparatus according to one or more of claims 1 to 20.

The advantages arising in connection with the apparatus are achieved in a corresponding manner with the method, which is why reference will be made to the relevant passages to avoid repetitions.

BRIEF DESCRIPTION OF THE DRAWINGS

Further advantageous developments and preferred embodiments emerge from the dependent claims and the description. An especially preferred embodiment of the apparatus and the method are explained in greater detail with reference to the drawing. The drawing shows:

DETAILED DESCRIPTION OF THE PREFERRED EMBODIMENTS

Figure 1:
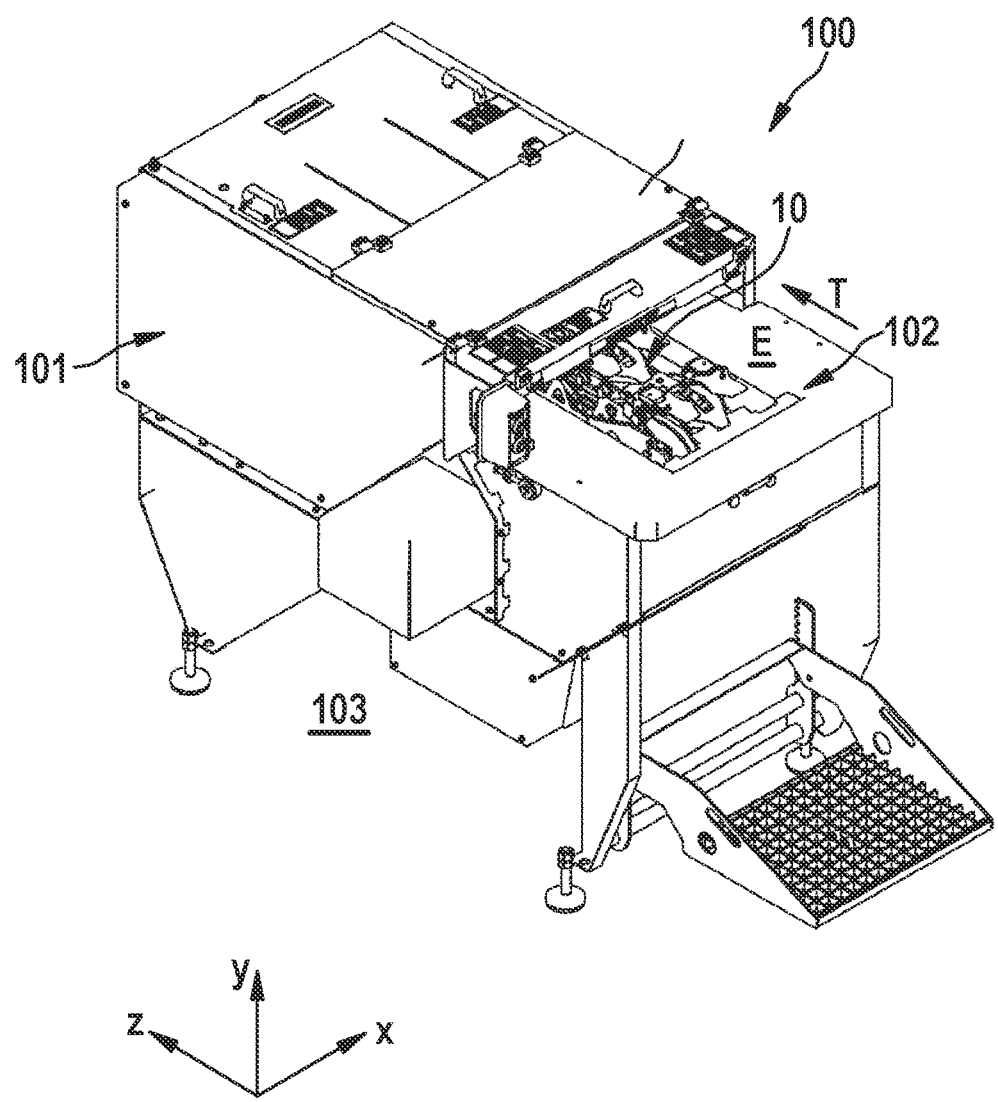
FIG. 1 is a schematic representation of a crab slaughter machine with an apparatus according to the invention for fixing and transporting crabs in perspective view.

The apparatus illustrated in the drawing is used for fixing and transporting crabs. The apparatus is also used in a corresponding manner for fixing and transporting other crustaceans, in particular crabs in any form, with a comparable body structure to the crabs shown in the drawing.

To facilitate better understanding of the invention, a crab slaughter machine 100 based on FIG. 1 is illustrated which comprises a frame rack 101 that bears an apparatus 10 for fixing and transporting the crabs 11 to be slaughtered. The apparatus 10 is designed and configured to transport the crabs 11 to be slaughtered from a loading station 102, at which the crabs are loaded into the crab slaughter machine 100 manually or by automated means, into the region of at least one processing station which is arranged along the apparatus 10, in such a manner that the crabs to be slaughtered can be brought into operative connection with the or each processing station. Preferably, a plurality of processing stations are provided inside the crab slaughter machine 100 to which the fixed crabs 11 are subsequently transported by means of the apparatus 10. Transportation takes place in the transport plane E. This is not a plane in the purely mathematical sense. Rather the transport plane E is described/defined by the crabs transported through the crab slaughter machine 100 by the apparatus 10. The following remarks relate to a crab slaughter machine 100 which stands on a flat, horizontal floor surface 103. However, the remarks also apply in a corresponding manner in the event that the crab slaughter machine 100 is placed on an inclined surface, i.e. sloping upwards for example. The crab slaughter machine 100 additionally comprises at least one (not explicitly shown) control device for controlling, for example, the drives for the apparatus 10 and/or the processing stations.

Figure 2:
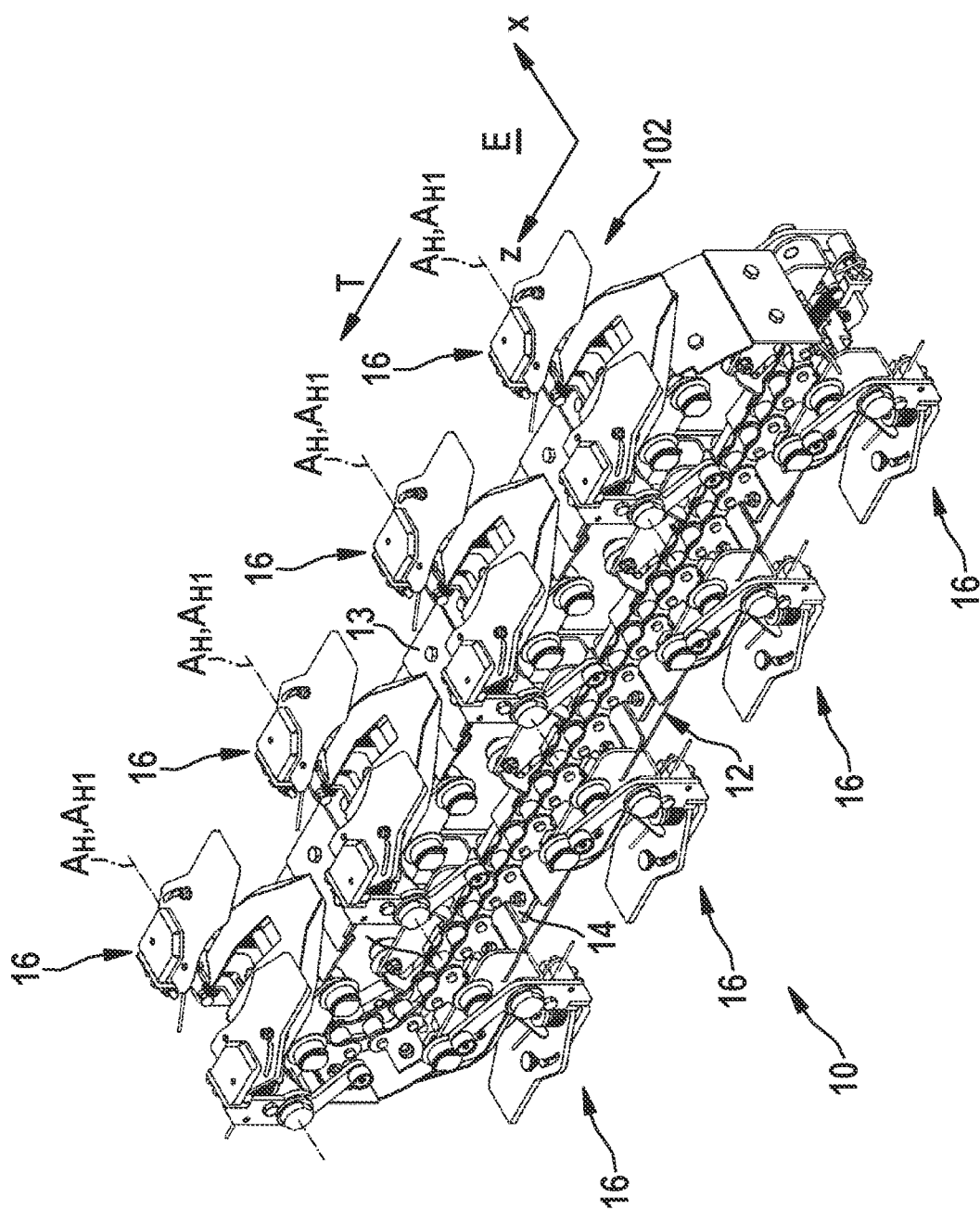
FIG. 2 is a schematic representation of the apparatus according to the invention for fixing and transporting crabs with eight holding apparatuses in perspective view.
Figure 3:
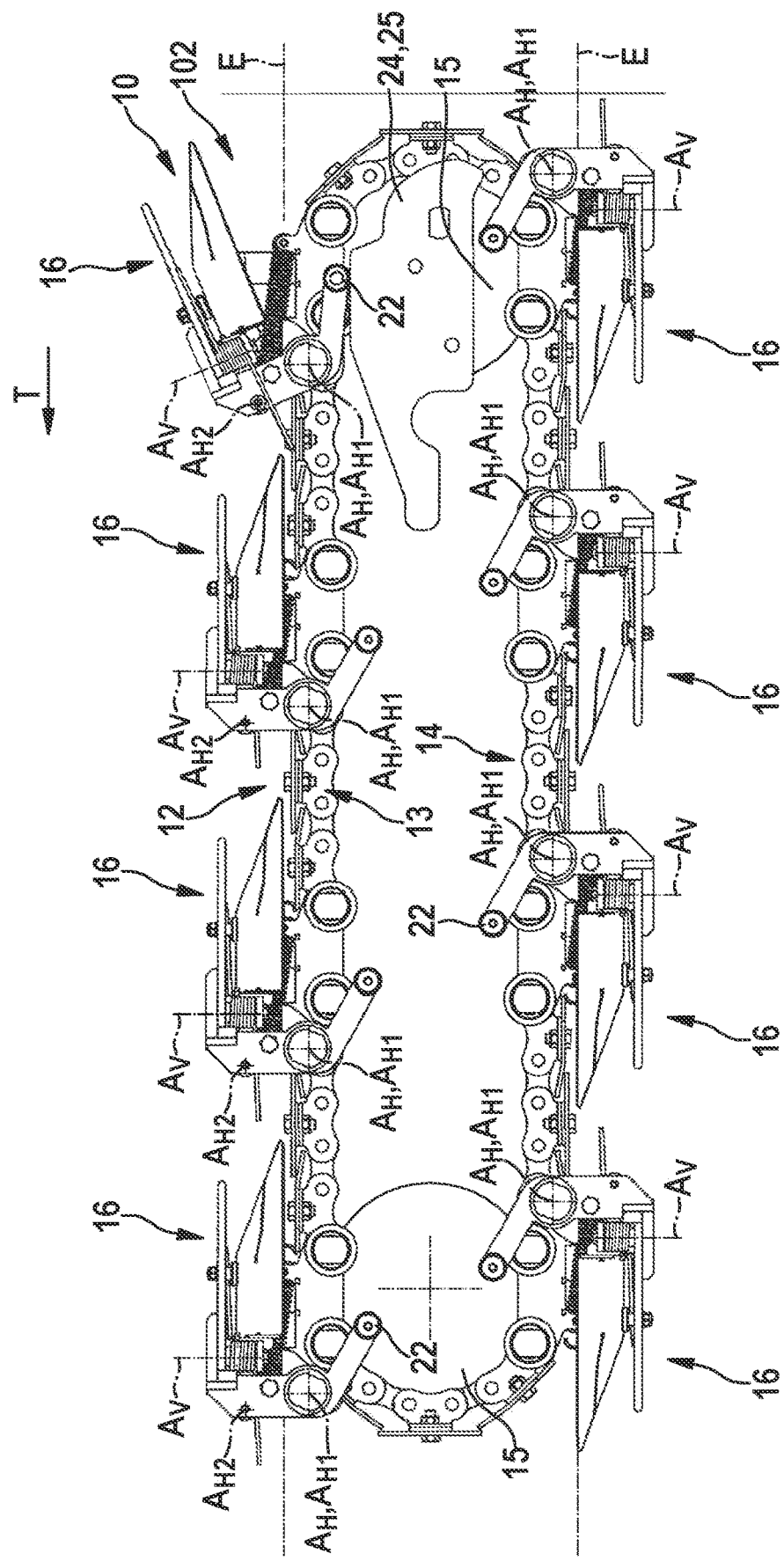
FIG. 3 is a lateral view of the apparatus according to FIG. 2 with a holding apparatus which is in receiving position in the loading position.
Figure 4:
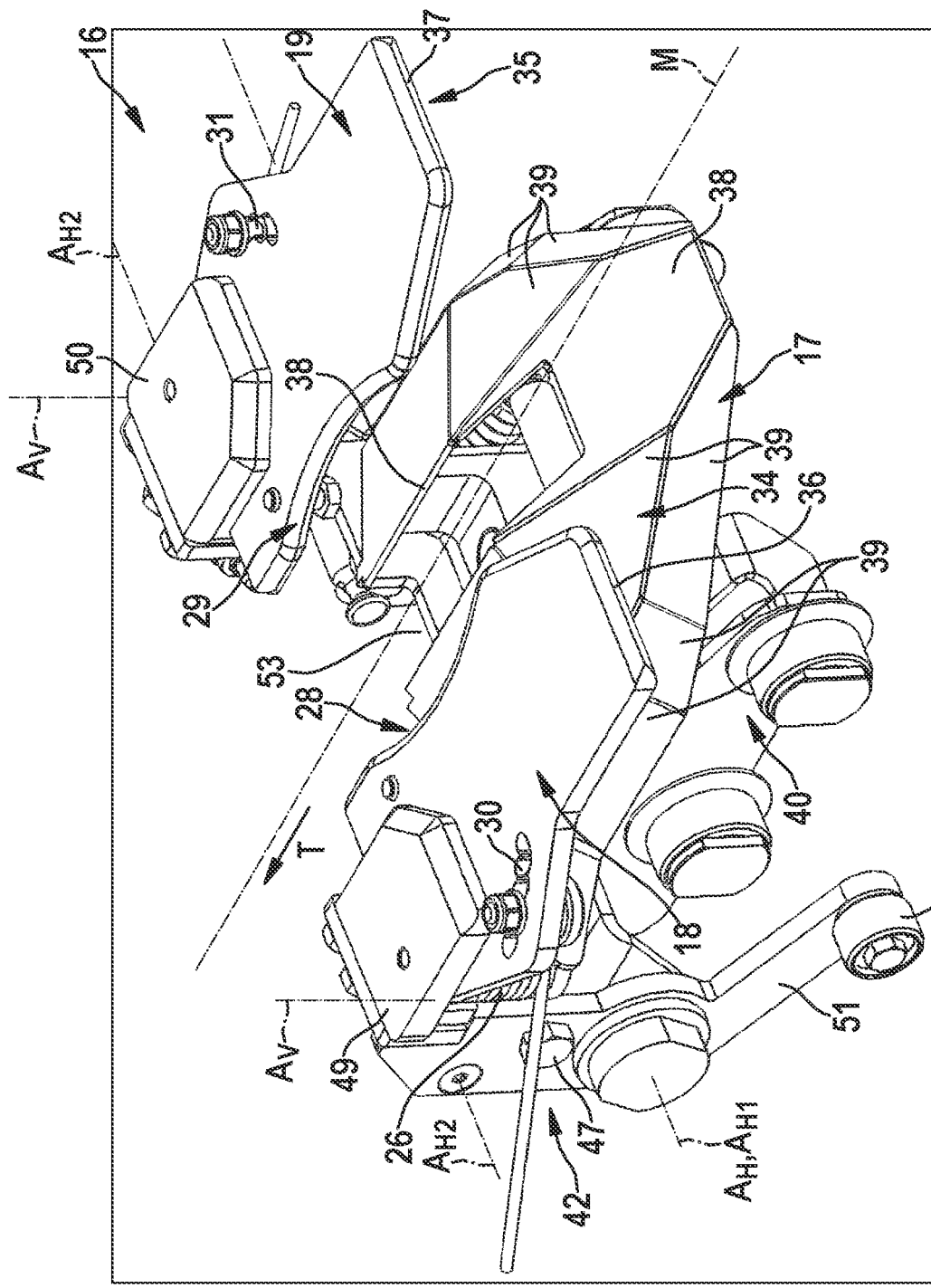
FIG. 4 is an enlarged representation of a holding apparatus of the apparatus in clamping position in a perspective view.
Figure 5:
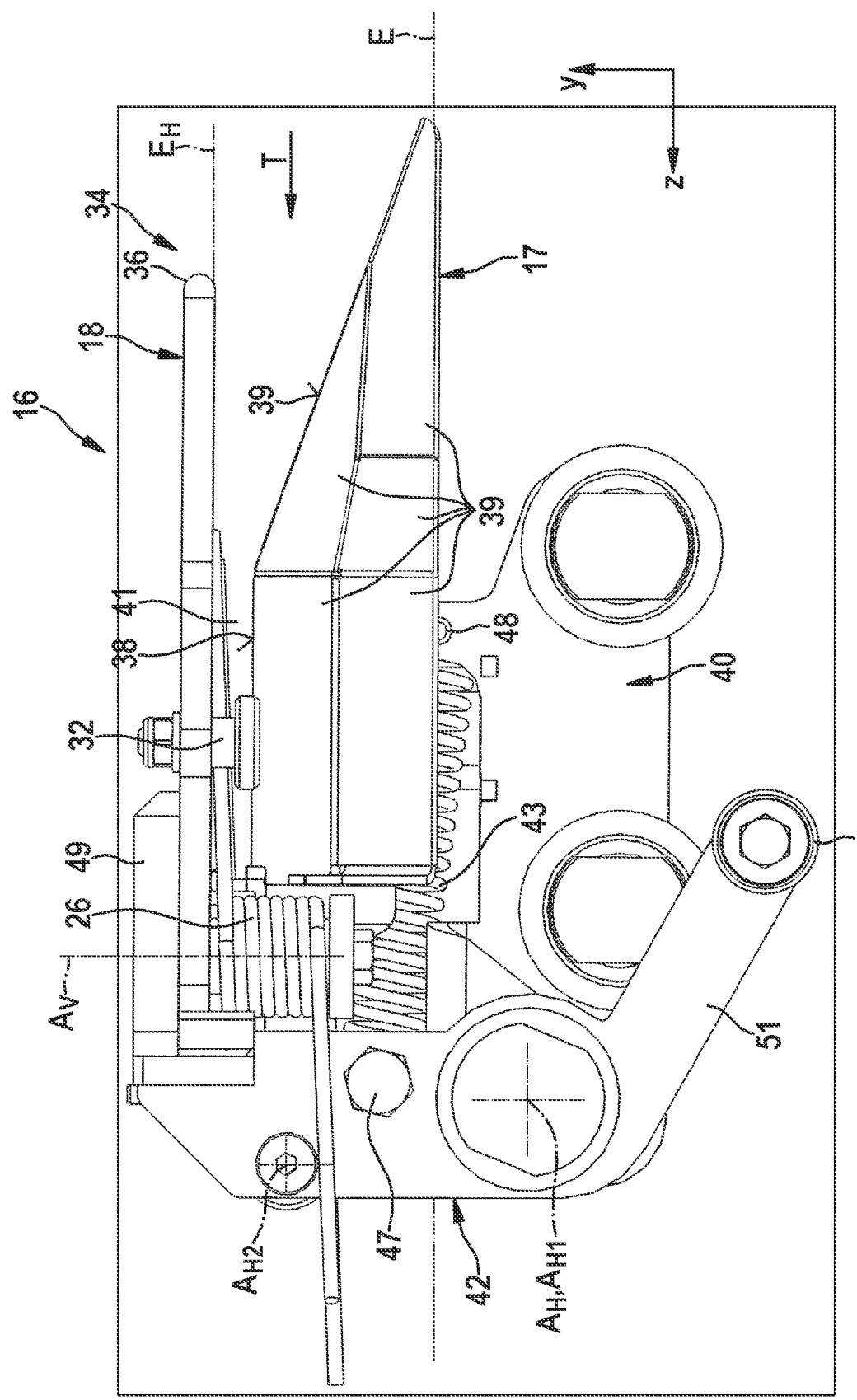
FIG. 5 is a lateral view of the holding apparatus according to FIG. 4.
Figure 8:
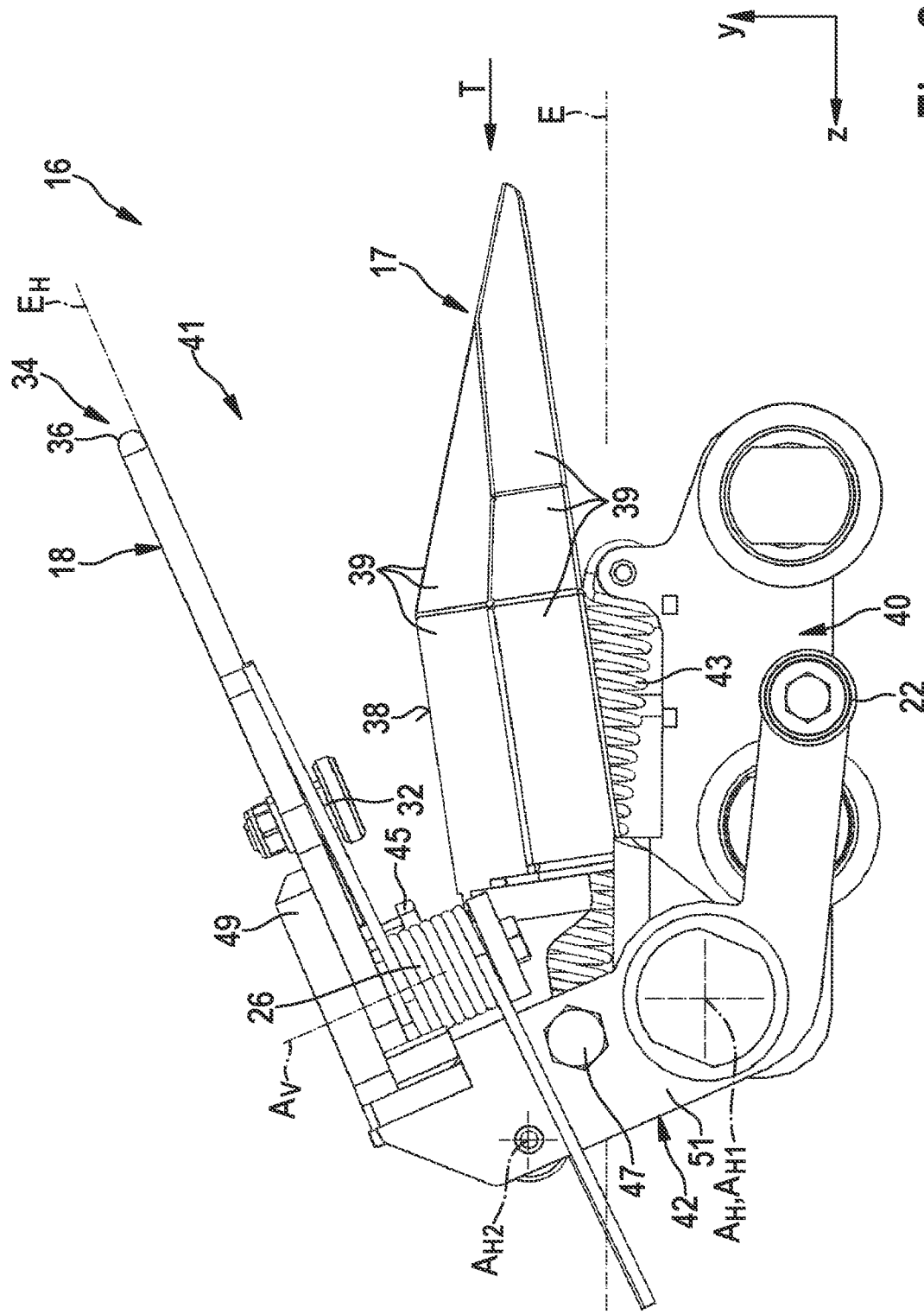
FIG. 8 is a view of the holding apparatus according to FIG. 5 in a receiving position.
Figure 9:
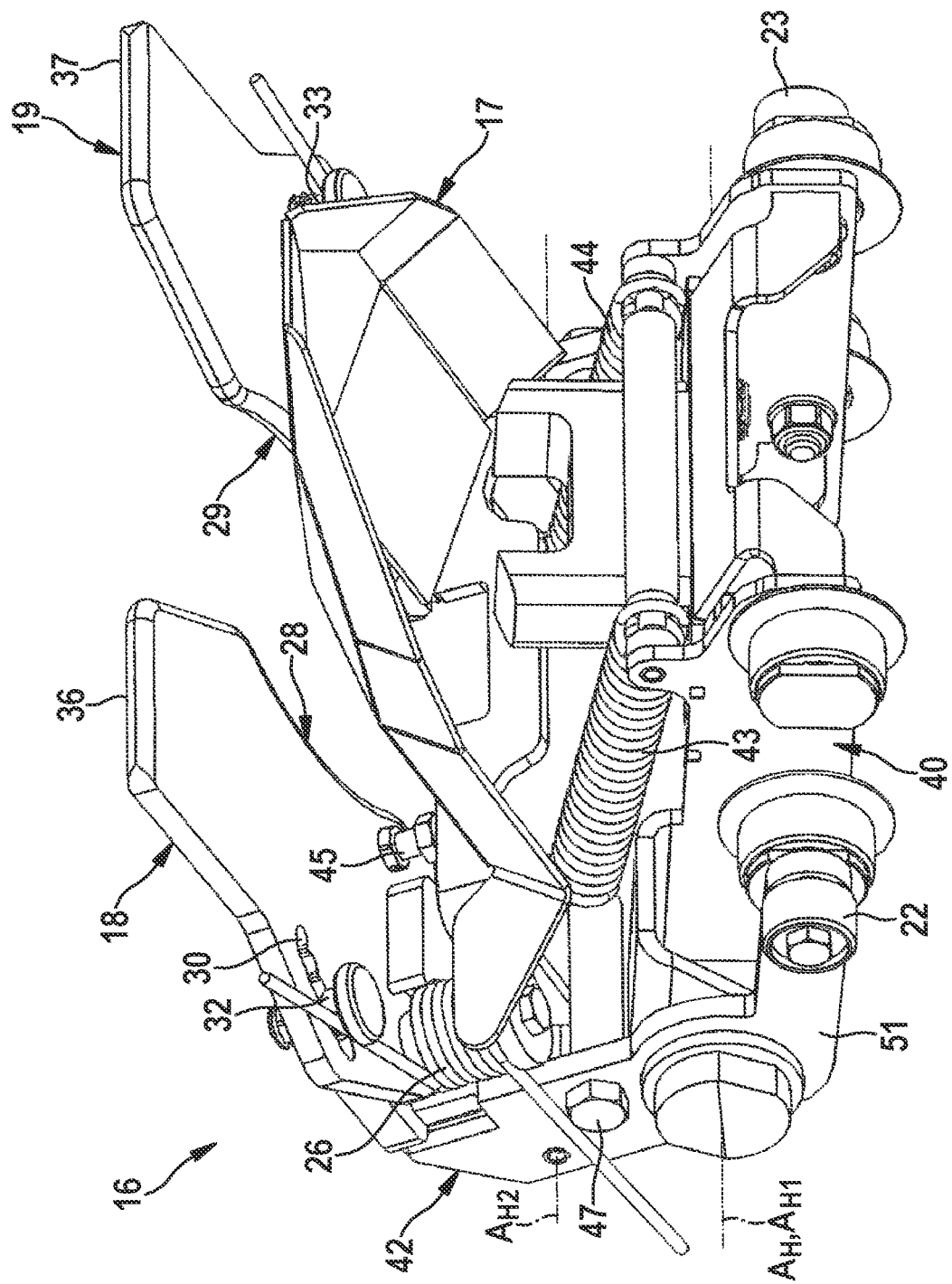
FIG. 9 is a perspective view of the holding apparatus according to FIG. 8.
Figure 10:
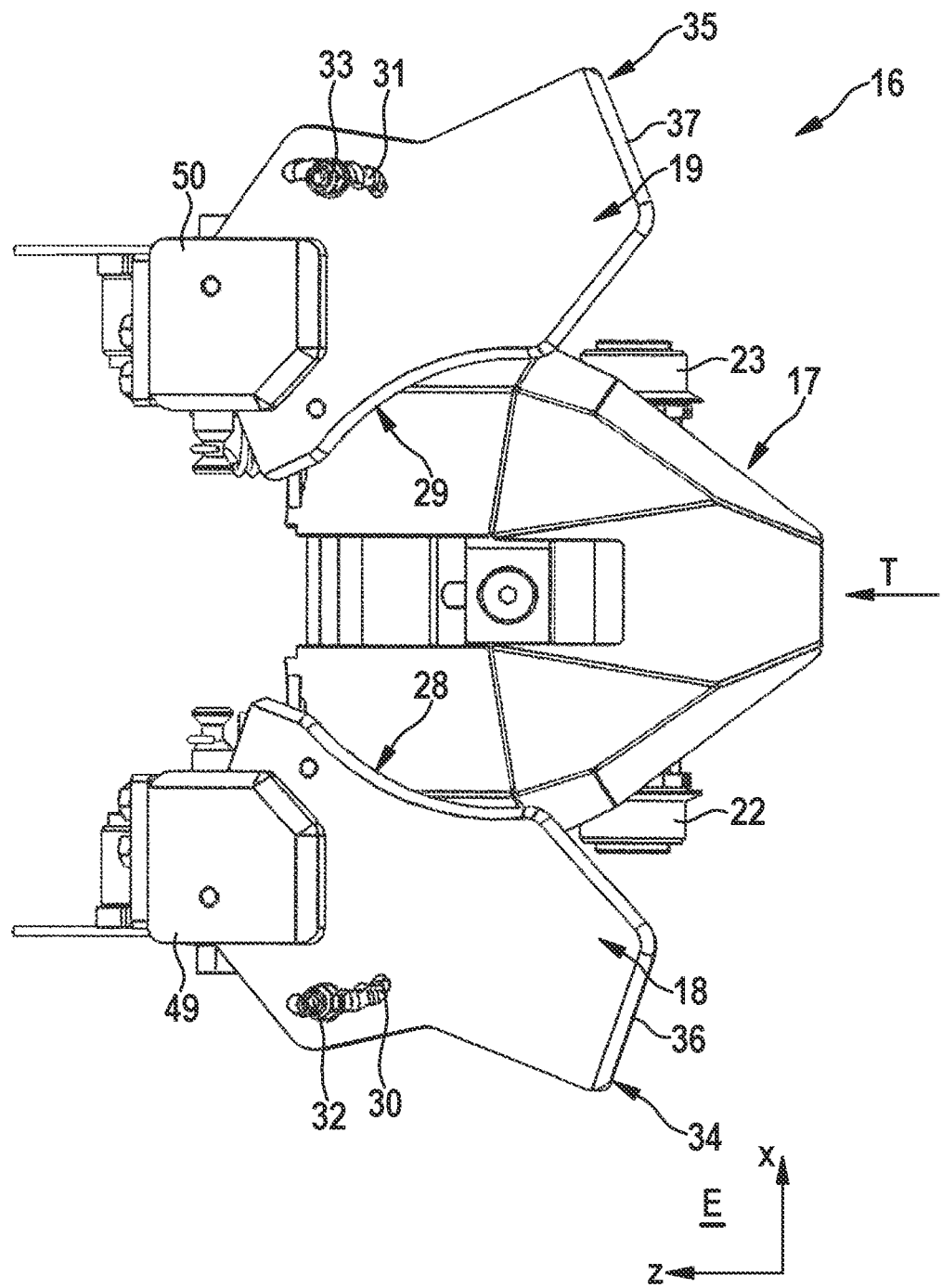
FIG. 10 is a top view of the holding apparatus according to FIG. 8 with the holding means in a receiving position and in loading position.
Figure 11:
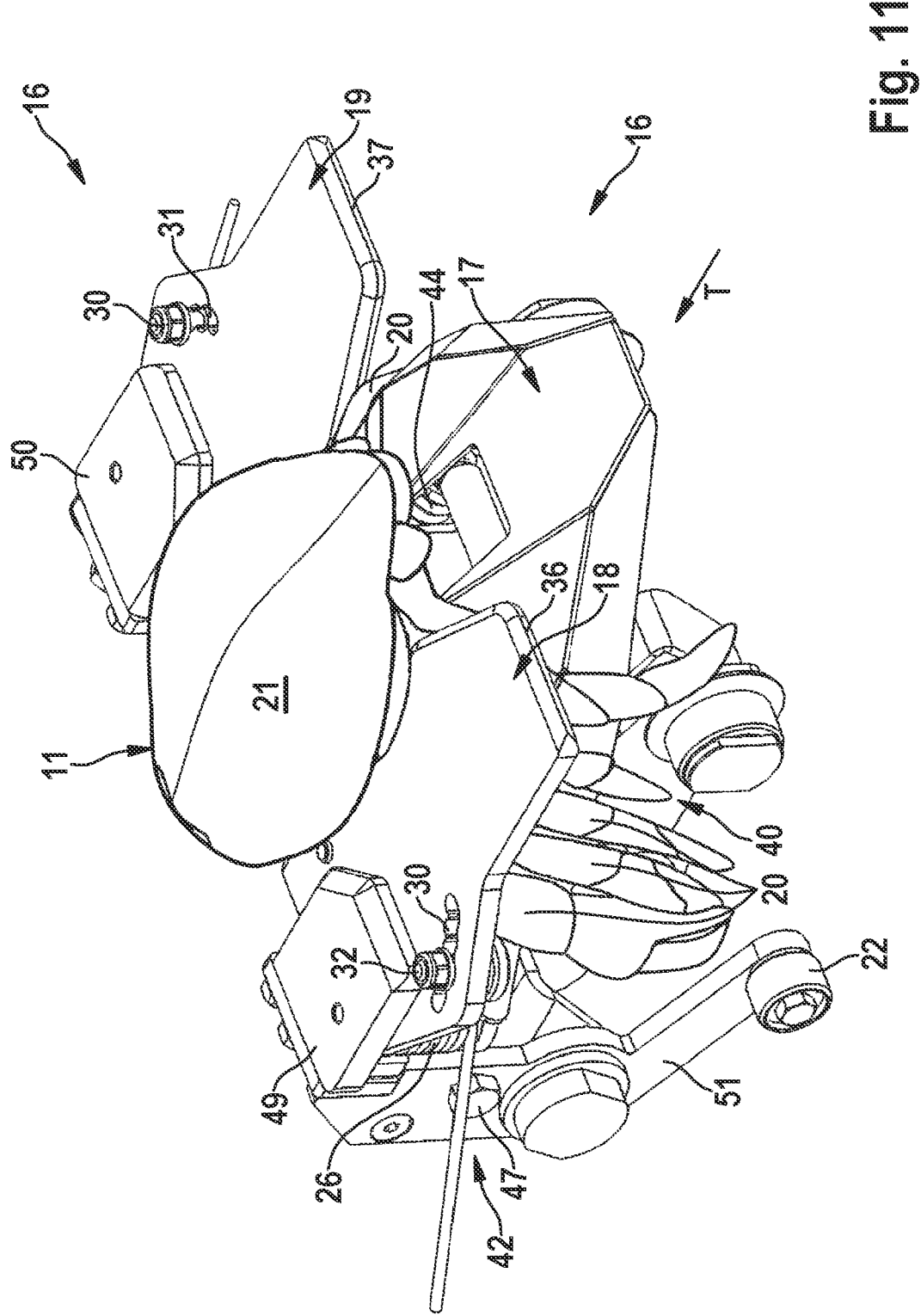
FIG. 11 is a view of the holding apparatus according to FIG. 7 with a fixed crab.
Figure 12:
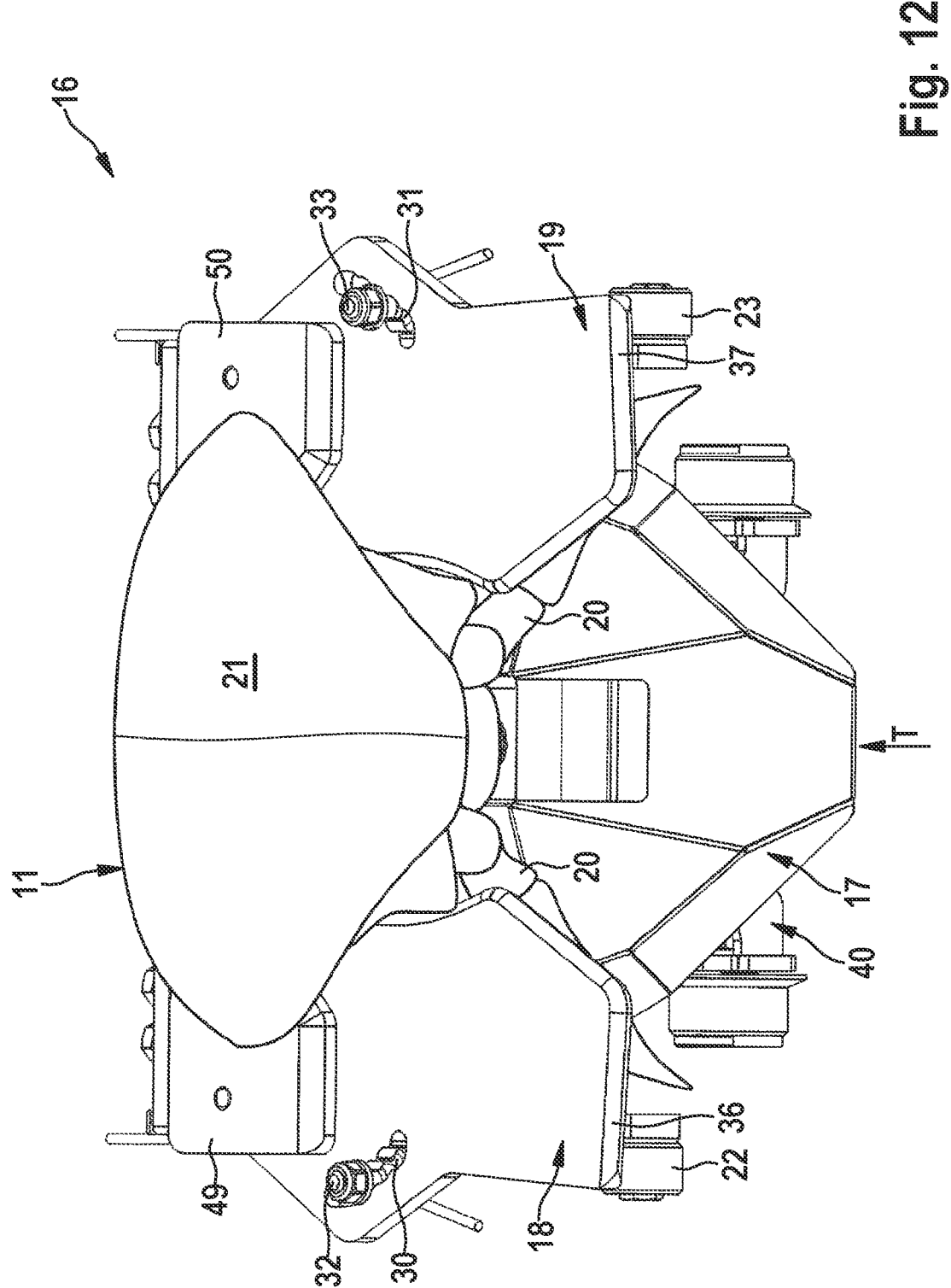
FIG. 12 is a view from the front and obliquely from above of the holding apparatus according to FIG. 11.

FIGS. 2 and 3 show an apparatus 10, designed and configured for fixing and transporting crabs 11 during the slaughter thereof, comprising a rotationally driven conveying element 12, which is guided about deflection and/or drive elements 15 to form an upper run 13 and a lower run 14, and at least one holding apparatus 16 for fixing the crabs 11 during slaughter, each holding apparatus 16 being attached to the conveying element 12 for transporting the fixed crabs 11 in a transport plane E and along a transport path in transport direction T from a loading station 102 to at least one processing station and each holding apparatus 16 comprising a supporting plate 17 for receiving a crab 11 to be slaughtered as well as at least two holding means 18, 19 arranged transversely to the transport direction T at a distance from each other, which, for fixing the crab 11 in the region of legs 20 on both sides of a dorsal shell 21 of the crab 11, are designed to be pivotable relative to the supporting plate 17 about an axis $A_H$, lying substantially in or parallel to the transport plane E and directed transversely to the transport direction T, from a receiving position (as shown by way of example in FIG. 8) into a clamping position (as shown by way of example in FIG. 5) and back.

The distance between the two holding means 18, 19 is used for this purpose and is chosen to be correspondingly large in order that the crab 11 can be received between them at least with its body mass. The conveying element 12 is associated with drive means (not explicitly shown) which can be controlled and operated by means of a control device, for example. The conveying element 12 comprises at least one holding apparatus 16. In the apparatus 10 illustrated, eight holding apparatuses 16 are provided which are evenly distributed over the length of the transport path, i.e. over the total length of the conveying element 12. The number of holding apparatuses 16 and their arrangement on the conveying element 12 relative to each other may vary. The upper run 13 may be the lower run 14 and vice versa, depending on the viewing angle and positioning of the apparatus 10 in the crab slaughter machine 100. The number of deflection and/or drive elements 15 may also vary. The conveying element 12 is preferably a conveyor chain which preferably comprises clamping elements (not explicitly shown).

This apparatus 10 is characterised according to the invention in that both holding means 18, 19 are designed to be movable, in addition to the pivoting movement about the axis $A_H$, towards and away from each other transversely to the transport direction T to vary their distance. The pivoting movement about the axis $A_H$ describes pivoting of the holding means 18, 19 towards and away from the legs of a crab 11 lying on the supporting plate 17 for fixing and releasing the crab 11. The additional possibility of the holding means 18, 19 moving transversely to the transport direction T describes the holding means 18, 19 moving laterally away from the body mass of the crab 11 to be placed on the supporting plate 17 and towards its, at least for positioning and centring the crab 11 and optionally also for fixing the crab 11.

When taken on their own and in combination with each other, the features and developments described below illustrate preferred embodiments. It is expressly pointed out that features which are summarised in the claims and/or the description and/or the drawing and/or are described in a common embodiment can also further develop the apparatus 10 described above in a functionally independent manner.

The holding means 18, 19 are associated with at least one roller 22 to initiate the pivoting movement about the axis $A_H$. In the preferred embodiment, both holding means 18, 19 are each associated with one roller 22, 23. Instead of the rollers 22, 23, other guide elements, for example sliding shoes or the like, may also be provided. A cam track 24, 25 is provided for each roller so that, with regard to their respective pivot position about the axis $A_H$, both holding means 18, 19 are positively controlled, at least in sections, along the transport path by means of at least one roller 22, 23 associated with the holding means 18, 19 and a corresponding cam track 24, 25. The cam tracks 24, 25 are placed along the conveying element 12, particularly in the region of the loading station 102, in order to move the holding means 18, 19 out of the clamping position into the receiving position to load the holding apparatus 16 with a crab 11 and back to fix the crab 11. However, the cam tracks 24, 25 may also extend into the region of the processing stations, the cam tracks 24, 25 then being shaped and designed in such a manner that the holding means 18, 19 are forcibly held in the clamping position. Instead of positive control by means of roller 22, 23 and cam track 24, 25, other actuating means can also be used for actively initiating and guiding the pivoting movement, for example in the form of pneumatic cylinders and/or servomotors.

Figure 6:
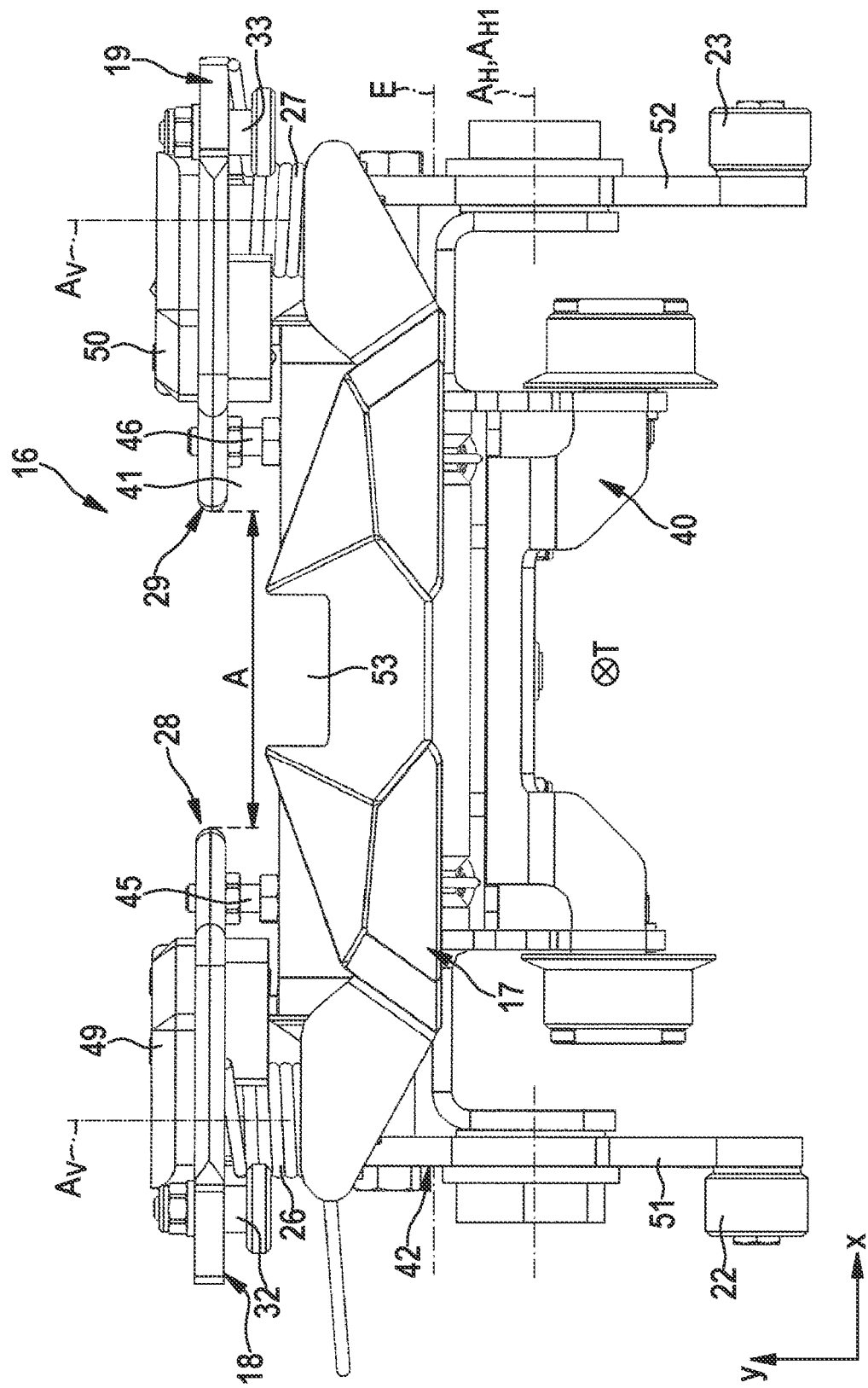
FIG. 6 is a front view of the holding apparatus according to FIG. 4.

Both holding means 18, 19 are designed to be pivotable about an axis $A_V$ which is directed substantially vertically to the transport plane E in the clamping position (see FIG. 5 for example), from a closing position into a loading position and back. By pivoting the holding means 18, 19 about the axis $A_H$ into the receiving position (see FIG. 8 for example), the orientation of the axis $A_V$ can be changed temporarily and deviates from the home position of the clamping position. Lateral movement of the holding means 18, 19 transversely to the transport direction T about the axis $A_V$ may be carried out actively, for example, by pneumatic cylinders, servomotors or the like. However, both holding means 18, 19 are preferably held in the closing position by means of a spring element 26, 27 and are designed to be deflectable into the loading position about the substantially vertically directed axes $A_V$ against the spring force of the spring elements 26, 27. Accordingly, pivoting of the holding means 18, 19 about the axis $A_V$ is a passively initiated movement, namely initiated by loading the holding apparatus 16 with a crab 11. The distance A (see FIG. 6 for example) between the holding means 18, 19 is pre-set, for example to a distance slightly smaller than the size of the crabs 11 to be slaughtered in the region of the body mass. Due to the loading process, the crab 11 pushes the two holding means 18, 19 outwards with its body mass such that the crab 11 is centred between the holding means 18, 19 and is also fixed laterally.

The holding means 18, 19 may assume almost any shape/form as long as they are designed to be pivotable about the axis $A_H$ out of the clamping position into the receiving position and back without colliding with the shell 21 of the crabs 11 and ensure fixing of the legs 20 between themselves and the supporting plate 17. Both holding means 18, 19 preferably have a contour on their inner sides 28, 29 facing each other which is adapted, at least in sections, to the body shape of the crabs (11). In other words, regions of said facing inner edges 28, 29 of the holding means 18, 19 are designed and configured for form-fitting contact with the crabs 11 to be slaughtered. Preferably and as shown in the drawing, the holding means 18, 19 are plate-shaped fixing elements, the inner edges 28, 29 of which, facing each other and spaced apart, are at least partially concave. In other words, on their inner edges 28, 29 the fixing elements have an inwardly directed radius, starting from the central axis M, which is substantially adapted to the "radius" of the body mass of the crabs 11 to be slaughtered, the term "radius" in connection with the body mass not being understood in the purely mathematical sense but expressing that the curvature of the inner edges 28, 29 and the curvature of the crab 11 or of its outer body contour match substantially in a form-fitting manner. The plate-shaped fixing elements define a plane $E_H$ which is oriented substantially parallel to the transport plane E in the clamping position. In the receiving position of the holding means 18, 19, the plane $E_H$ intersects the transport plane E. The axis $A_V$ for pivoting the holding means 18, 19 towards and away from each other is always perpendicular to the plane $E_H$, which in the receiving position is inclined to the transport plane E (see FIG. 8) and in the clamping position is substantially parallel to the transport plane E (see FIG. 5).

As already mentioned, the two holding means 18, 19 are arranged transversely to the transport direction T at a distance from each other, preferably at a pre-set distance A which allows the insertion/loading of a crab 11 into the holding apparatus 16. The position of the holding means 18, 19 relative to each other in the transport plane E or parallel thereto in the closing position is designed to be adjustable, i.e. in particular the gap A between the holding means 18, 19 transversely to the transport direction T in the closing position. Preferably, elongated holes 30, 31 having a plurality of rest positions are provided. A bolt 32, 33 or the like, which forms an abutment for the spring elements 26, 27 to limit the pivoting movement towards the central axis M, is guided through the elongated holes 30, 31. The position of the bolt 32, 33 can be changed along the elongated hole 30, 31, it being possible to fix the bolt 32, 33 in any rest position. Infinitely variable adjustment of the distance A is also possible as an option. Differing from or supplementary to purely mechanical adjustment, which incidentally can also be implemented in other ways, pneumatic and/or motorised and in particular electrically and/or electronically controlled adjustment may also be used.

Figure 7:
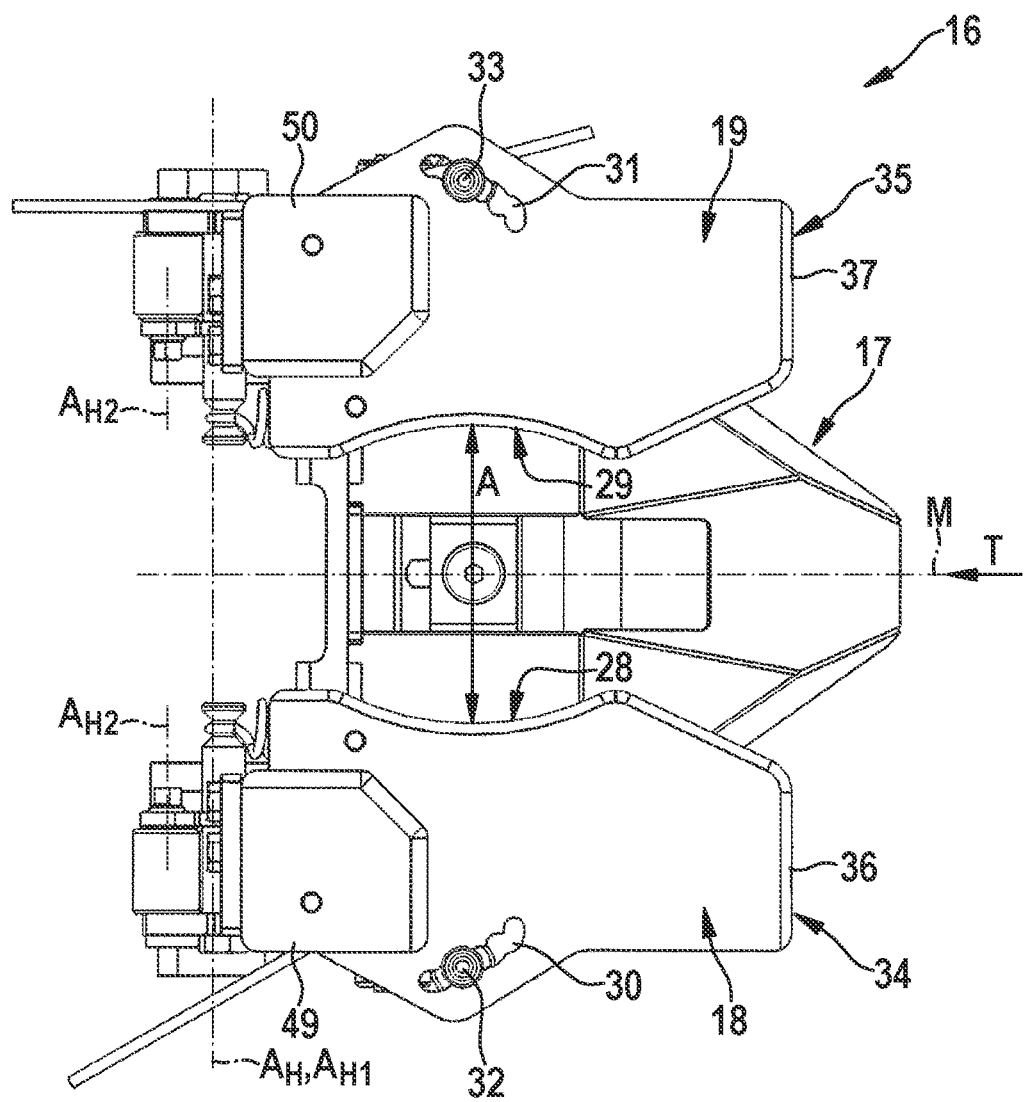
FIG. 7 is a top view of the holding apparatus according to FIG. 4 with the holding means in a clamping position and in closing position.

The holding means 18, 19 were described above in a preferred embodiment as plate-shaped fixing elements. Both holding means 18, 19, i.e. in particular both plate-shaped fixing elements, are designed in each case to be bevelled on an entry-side end 34, 35 of the crabs 11 into the holding apparatus 16 in such a manner that the two spaced-apart holding means 18, 19 together form a guidance aid which converges in transport direction T when the crabs 11 are inserted into the holding apparatus 16. The plate-shaped fixing elements, also referred to as fixing plates, thus have inner edges 28, 29 which, starting from a front edge 36, 37 of the holding means 18, 19 which runs in each case transversely to the transport direction T in the closing position, run initially towards the central axis M, open into the concave recess and run out behind the concave recess linearly and substantially parallel to the central axis M (see FIG. 7 for example). Of course, the inner edges 28, 29 may also have a different line.

In simple embodiments, the supporting plate 17 may be flat. The supporting plate 17 is preferably adapted regarding its shape to the natural position of the crabs 11 to be fixed, in such a manner that, starting from a supporting surface 38 which, for supporting a ventral bone plate of the crab 11, preferably lies substantially in the transport plane E or parallel thereto, the supporting plate 17 is designed to slope downwards at least in sections towards the sides with lateral supporting surfaces 39 for supporting legs 20 of the crab 11 and/or towards the front for inserting the crab 11 between the supporting plate 17 and the holding means 18, 19 contrary to the transport direction T. Due to this shaping, the legs 20 of the crabs 11 may be supported securely and two-dimensionally in the natural posture, i.e. in particular even with curved leg position. The ramp-like line of the lateral supporting surface 39, which is contrary to the transport direction T, leads onto the supporting surface 38 in a virtually sliding and barrier-free manner. The formation of the inclination of the supporting surfaces 38 and the lateral supporting surfaces 39, their number and line may vary. A recess 53, indentation, groove or the like may optionally be formed in the region of the supporting surface 38. This may receive protrusions, unevenness or other interfering edges of the bone plate so that the bone plate rests evenly on the supporting surface 38.

The holding apparatus 16 may be connected immediately and directly, i.e. without intermediate element, to the conveying element 12. Preferably, however, each holding apparatus 16 is connected to the conveying element 12 by means of a fastening unit 40, the fastening unit 40 being connected firmly and immovably relative to the conveying element 12 but being connected rotationally to said conveying element 12. The fastening unit 40 may be a simple mounting plate, for example. In the embodiment shown according to the drawing, the fastening unit 40 is a functional element which is firmly connected to the conveying element 12 in a releasable manner, said functional element being arranged on the holding apparatus 16. The functional element may be part of the conveying element 12 or the holding apparatus 16.

The supporting plate 17 and the holding means 18, 19 are pivotably mounted on the fastening unit 40. The holding means 18, 19 are situated above the supporting plate 17, so that a gap 41 is formed between them in which there is room for the legs 20 of the crabs 11 to be slaughtered. Detailed remarks about each of the pivotable mountings will be made below. The supporting plate 17 and the holding means 18, 19 may be arranged directly on the fastening unit 40. Preferably, both the supporting plate 17 and the two holding means 18, 19 are mounted on a pivot device 42, the pivot device 42 being designed to be pivotable relative to the conveying element 12 about an axis $A_{H1}$, lying substantially in or parallel to the transport plane E and directed transversely to the transport direction T, from a receiving position into a clamping position and back. For this purpose, the pivot device 42 is mounted on the fastening unit 40. Due to this pivoting movement about the axis $A_{H1}$, the holding means 18, 19 can be moved up and down relative to the conveying element 12, which results in the legs 20 of the crabs 11 being fixed between the holding means 18, 19 and the supporting plate 17, which is why the axis $A_H$ corresponds to the axis $A_{H1}$. As the supporting plate 17 is also arranged on the pivot device 42, it also moves relative to the conveying element 12 but, due to separate mounting points, not evenly to the holding means 18, 19.

The pivot device 42 is associated with at least one roller 22 which is guided, at least in sections, along a cam track 24 along the transport path, in such a manner that the pivot device 42 is pivotable about the axis $A_{H1}$ from the clamping position into the receiving position and back in the region of the loading station 102 against the spring force of spring elements 43, 44 which are tensioned between the pivot device 42 and the fastening unit 40, in such a manner that the pivot device 42 is basically held in the clamping position against an abutment 45, 46. Basically, the spring elements 43, 44 pull the pivot device 42 into the clamping position, which is why this position is also referred to as the home position. The fastening points 47 of the spring elements 43, 44 on the pivot device 42 are situated in the upper run 13, in relation to the conveying plane E, above the fastening points 48 of the spring elements 43, 44 on the fastening unit 40.

The pivotable mounting of the holding means 18, 19 about the axis $A_{H1}$ has been described previously relative to the fastening unit 40. The supporting plate 17 is also pivotably mounted relative to the fastening unit 40, namely, on the one hand, about the axis $A_{H1}$. On the other hand, the supporting plate 17 is mounted on the pivot device 42 so as to be pivotable about an axis $A_{H2}$ which is directed parallel to the axis $A_{H1}$, in such a manner that the supporting plate 17 is designed to be pivotable relative to the pivot device 42 and relative to the holding means 18, 19. The axis $A_{H2}$ is situated in the upper run 13, in relation to the conveying plane E, above the axis $A_{H1}$ and preferably also above the fastening points 47, 48 of the spring elements 43, 44.

As described, on the one hand, the holding means 18, 19 are mounted on the fastening unit 40 so as to be pivotable about the axis $A_{H1}$. On the other hand, the holding means 18, 19 are each mounted on a carrier element 49, 50 so as to be pivotable about the axis $A_V$, the carrier elements 49, 50 being firmly connected to the pivot device 42 and being pivotable therewith about the axis $A_{H1}$. The pivoting movements about the axes $A_{H1}$ and $A_V$ and also about the axis $A_{H2}$ can be superimposed on each other.

The minimum distance in the clamping position between the holding means 18, 19 on the one hand and the supporting plate 17 for forming the gap 41 on the other hand is limited vertically to the transport plane E by an abutment 45, 46. The abutments 45, 46 may strike, for example, against the pivot device 42 or a cross-member of the supporting plate 17. The abutments 45, 46 are designed to be adjustable with regard to setting the size of the minimum distance. The abutments, for example, may be formed by a simple screw which can be screwed into and out of a thread to alter the distance. Of course, other common spacer solutions can also be used.

The pivot device 42 may be designed as a continuous structure bearing both holding means 18, 19. Preferably, however, the pivot device 42 comprises two pivot arms 51, 52, each of which is mounted separately on the fastening unit 40 so as to be pivotable about the axis $A_{H1}$, the supporting plate 17 being mounted on both pivot arms 51, 52 so as to be pivotable about the axis $A_{H2}$ and arranged on each pivot arm 51, 52 is a holding means 18, 19 which on the one hand is mounted on a carrier element 49, 50, which is fastened to the pivot arm 51, 52, so as to be pivotable about the axis $A_V$ and on the other hand is pivotable with the pivot arm 51, 52 about the axis $A_{H1}$. In this case, each pivot arm 51, 52 is held in the clamping position via a spring element 43, 44, which is arranged with one end on the pivot arm 51, 52 and with the opposing end on the fastening unit 40, and each pivot arm 51, 52 has a roller 22, 23 which is guided along a separate cam track 24, 25 for positive control of the pivot arms 51, 52 at least in sections and thus at least also of the holding means 18, 19. Preferably, two cam tracks 24, 25 are provided which extend in transport direction T at least in the region of the loading station 102 and are designed and configured in such a manner that each pivot arm 51, 52 in the loading station 102 is pivoted from the clamping position into the receiving position against the spring force of the spring element 43, 44, and which cam tracks preferably extend into the region of the or each processing station and are designed and configured in such a manner that the pivot arms 51, 52 are forcibly held in the clamping position to support the spring force in the region of the processing stations.

In an embodiment which is not explicitly shown, means for holding the holding means 18, 19 in the closing position are arranged along the conveying element 12, preferably in the region of the or each processing station. The means may be, for example, two holding plates arranged on both sides of the conveying element 12 which limit the space laterally along the transport path in such a manner that the holding apparatuses 16 with their holding means 18, 19 can just pass through. The holding plates may be designed and arranged to be rigid or preferably deflectable. For this purpose, the holding plates may be spring-loaded, for example. In a preferred embodiment, the holding plates are held in a holding position, for example by means of pneumatic cylinders with a pressure directed inwards toward the central axis M, the holding plates being pushed outwards by the holding apparatuses 16. In addition, the holding plates may have—preferably curved—recesses which are designed and configured in such a manner that the crabs can pass the holding plates with their body and in particular with their legs, substantially without colliding. Instead of the holding plates, cam tracks, for example, may also be provided.

The apparatus 10 was described above as a single arrangement. The invention also relates in a corresponding manner to the crab slaughter machine 100 with a previously described apparatus 10 according to one or more of claims 1 to 20.

The method according to the invention is explained in greater detail below based on the drawing.

The method is used for fixing and transporting crabs 11 during the slaughter thereof and comprises the following steps: rotational driving of a conveying element 12 with at least one holding apparatus 16, loading of the holding apparatus 16 with a crab 11 in the region of a loading station 102, the crab 11 for loading of the holding apparatus 16 being pushed onto a supporting plate 17 of the holding apparatus 16 with a bone plate of the crab 11 downwards, mouth forwards and legs 20 projecting laterally in transport direction T of the conveying element 12, and the crab 11 is then fixed on the supporting plate 17 on both sides of the shell 21 in the region of the legs 20 by lowering two holding means 18, 19 of the holding apparatus 16, which are arranged transversely to the transport direction T at a distance from each other, by pivoting from a receiving position of the holding means 18, 19 into a clamping position about an axis $A_H$ directed substantially in or parallel to the transport plane and transversely to the transport direction T, the crab 11 being thus fixed is transported further into the region of at least one processing station.

The actual fixing of the crabs 11 is thus carried out via a pivoting movement of the holding means 18, 19 towards the supporting plate 17, the holding means 18, 19 striking the legs 20 of the crabs 11 on both sides of the shell 21 and clamping said legs between the holding means 18, 19 and the supporting plate 17.

According to the invention, the holding means 18, 19, before reaching the final clamping position, in which the holding means 18, 19 are, however, lower than the shell 21 of the crab 11, are moved towards each other transversely to the transport direction T underneath the shell 21 until the holding elements 18, 19 rest on a body mass of the crab 11 on both sides in the region of the shoulder joints, before the holding means 18, 19 are then lowered completely into the final clamping position about the axis $A_H$. The position of the holding means 18, 19 lower than the shell 21 describes a position in which the holding means 18, 19 are entirely lower than the lower edge of the shell 21 which protrudes beyond the body mass of the crab 11 in relation to the conveying plane E but are still higher than in the final clamping position.

Preferably, the crab 11 is pushed into gap 41 formed between holding means 18, 19 located in the receiving position and supporting plate 17, in such a manner that the crab 11 lies with its bone plate on the supporting plate 17 and with its shell 21 above the holding means 18, 19, the crab 11 with its body mass pushing open spring-loaded holding means 18, 19 transversely to the transport direction T about an axis $A_V$ which in the clamping position is directed substantially vertically to the transport plane E, such that, even before final fixing, the crab 11 is centred and fixed laterally by the holding means 18, 19 before said holding means 18, 19 are pivoted towards the supporting plate 17 into the final clamping position.

Especially advantageously, both the supporting plate 17 and the holding means 18, 19 in the loading station 102 are pivoted during loading from a clamping position into a receiving position relative to the conveying element 12 about the axis $A_{H1}$ directed in or parallel to the transport plane E and transversely to the transport direction T to form a sufficiently large gap 41, wherein the supporting plate 17 is additionally pivoted relative to the holding means 18, 19 about an axis $A_{H2}$, which is oriented parallel to the axis $A_{H1}$, to enlarge the gap 41.

After the loading process, i.e. pushing of the crab 11 onto the supporting plate 17, during which the crab 11 is centred and prefixed laterally by pivoting the holding means 18, 19 about the axis $A_V$, the holding means 18, 19, on leaving the loading station 102 at the latest, are necessarily pulled into the final clamping position by spring force and/or a control curve, as a result of which the holding means 18, 19 together with the supporting plate 17 are pushed around the axes $A_{H1}$ and $A_{H2}$ in the direction of the conveying element 12, while the holding means 18, 19 are pushed towards each other by means of spring force about the axis $A_V$ in the direction of the crab 11. Pivoting of the holding means 18, 19 about the axis $A_V$ on the one hand and the axis $A_{H1}$ on the other hand can be superimposed, as can pivoting of the supporting plate 17 about the axis $A_{H2}$.

The crab 11 thus fixed is transported along the transport path from processing station to processing station, processed at each of them and released from the holding apparatus 16 after the last processing station.

Preferably, the holding means 18, 19 are held laterally, at least in the region of the or each processing station, by means for holding the holding means 18, 19 in a closing position. The pivoting movement of the holding means 18, 19 about the axis $A_V$ is barred or blocked at least in the region of the processing stations, so that the crabs 11 remain securely fixed in the optimum position despite the high forces acting on them.

Especially preferably, the method is carried out using an apparatus 10 according to one or more of claims 1 to 20.

The invention claimed is:

1. An apparatus, designed and configured for fixing and transporting crabs during the slaughter thereof, comprising:
a rotationally driven conveying element, which is guided about deflection and/or drive elements to form an upper run and a lower run; and
at least one holding apparatus for fixing the crabs during slaughter
wherein each holding apparatus is attached to the conveying element for transporting the fixed crabs in a transport plane E and along a transport path in a transport direction T from a loading station to at least one processing station and each holding apparatus comprises a supporting plate for receiving a crab to be slaughtered as well as at least two holding means arranged transversely to the transport direction T at a distance from each other, which, for fixing the crab in the region of legs on both sides of a dorsal shell of the crab, are designed to be pivotable relative to the supporting plate about an axis $A_H$, lying substantially in or parallel to the transport plane E and directed transversely to the transport direction T, from a receiving position into a clamping position and back, characterised in that, in addition to the pivoting movement about the axis $A_H$, both holding means are designed to be movable towards and away from each other transversely to the transport direction T to vary their distance.

2. The apparatus according to claim 1, wherein, with regard to their respective pivot position about the axis $A_H$, both holding means are positively controlled, at least in sections, along the transport path by at least one roller associated with the holding means and a corresponding cam track.

3. The apparatus according to claim 1, wherein both holding means are designed to be pivotable about an axis $A_V$ which is directed substantially vertically to the transport plane E in the clamping position, from a closing position into a loading position and back.

4. The apparatus according to claim 3, wherein both holding means are held in the closing position by a spring element and are designed to be deflectable into the loading position about the substantially vertically directed axes $A_V$ against the spring force of the spring elements.

5. The apparatus according to claim 4, wherein means for holding the holding means in the closing position are arranged along the conveying element, in the region of the or each processing station.

6. The apparatus according to claim 3, wherein both the supporting plate and both holding means are mounted on a pivot device, wherein the pivot device is designed to be pivotable relative to the conveying element about an axis $A_{H1}$, lying substantially in or parallel to the transport plane E and directed transversely to the transport direction T, from a receiving position into a clamping position and back.

7. The apparatus according to claim 6, wherein the pivot device is associated with at least one roller which is guided at least in sections along a cam track along the transport path, in such a manner that the pivot device is pivotable about the axis $A_{H1}$ from the clamping position into the receiving position and back in the region of the loading station against the spring force of spring elements which are tensioned between the pivot device and the fastening unit, in such a manner that the pivot device is basically held in the clamping position against an abutment.

8. The apparatus according to claim 6, wherein the supporting plate is mounted on the pivot device so as to be pivotable about an axis $A_{H2}$, which is directed parallel to the axis $A_{H1}$, in such a manner that the supporting plate is designed to be pivotable relative to the pivot device and relative to the holding means.

9. The apparatus according to claim 6, wherein the holding means are each mounted on a carrier element so as to be pivotable about the axis $A_V$, wherein the carrier elements are firmly connected to the pivot device and are pivotable therewith about the axis $A_{H1}$.

10. The apparatus according to claim 6, wherein a minimum distance in the clamping position between the holding means on the one hand and the supporting plate on the other hand is limited vertically to the transport plane E by an abutment.

11. The apparatus according to claim 6, wherein the pivot device comprises two pivot arms, each of which is mounted separately on the fastening unit so as to be pivotable about the axis $A_{H1}$, wherein the supporting plate is mounted on both pivot arms so as to be pivotable about the axis $A_{H2}$ and arranged on each pivot arm is said holding means which on the one hand is mounted on a carrier element, which is fastened to the pivot arm, so as to be pivotable about the axis $A_V$ and on the other hand is pivotable with the pivot arm about the axis $A_{H1}$.

12. The apparatus according to claim 6, wherein each pivot arm is held in the clamping position via a spring element, which is arranged with one end on the pivot arm and with the opposing end on the fastening unit, and each pivot arm has a roller which is guided along a separate cam track for positive control of the pivot arms at least in sections and thus at least also of the holding means.

13. The apparatus according to claim 12, wherein two cam tracks are provided which extend in transport direction T at least in a region of the loading station and are designed and configured in such a manner that each pivot arm in the loading station is pivoted from the clamping position into the receiving position against the spring force of the spring element, and which cam tracks extend into the region of the or each processing station and are designed and configured in such a manner that the pivot arms are forcibly held in the clamping position to support the spring force in the region of the processing stations.

14. The apparatus according to claim 1, wherein both holding means have a contour on their inner sides facing each other which is adapted at least in sections to the body shape of the crabs.

15. The apparatus according to claim 1, wherein the holding means are plate-shaped fixing elements, the inner edges of which, facing each other and spaced apart, are at least partially concave.

16. The apparatus according to claim 1, wherein the position of the holding means relative to each other is designed to be adjustable in the transport plane E or parallel thereto in the closing position.

17. The apparatus according to claim 1, wherein both holding means are designed in each case to be bevelled on an entry-side end of the crabs into the holding apparatus in such a manner that the two spaced-apart holding means together form a guidance aid which converges in the transport direction T when the crabs are introduced into the holding apparatus.

18. The apparatus according to claim 1, wherein the supporting plate is adapted regarding its shape to the natural position of the crabs to be fixed, in such a manner that, starting from a supporting surface which, for supporting a ventral bone plate of the crab, lying substantially in the transport plane E or parallel thereto, the supporting plate is designed to slope downwards, at least in sections, towards the sides with lateral supporting surfaces for supporting legs of the crab and/or towards the front for inserting the crab between the supporting plate and the holding means contrary to the transport direction T.

19. The apparatus according to claim 1, wherein each holding apparatus is connected to the conveying element by a fastening unit, wherein the fastening unit is connected firmly and immovably relative to the conveying element but is connected rotationally to said conveying element.

20. The apparatus according to claim 19, wherein the supporting plate and the holding means are pivotably mounted on the fastening unit.

21. A method for fixing and transporting crabs during the slaughter thereof, comprising the steps:
  rotational driving of a conveying element with at least one holding apparatus;
  loading of the holding apparatus with a crab in the region of a loading station;
  wherein, for loading the holding apparatus, the crab is pushed onto a supporting plate of the holding apparatus with a bone plate of the crab downwards, mouth forwards and legs projecting laterally in transport direction T of the conveying element;
  and the crab is then fixed on the supporting plate on both sides of the shell in the region of the legs by lowering two holding means of the holding apparatus, which are arranged transversely to the transport direction T at a distance from each other, by pivoting from a receiving position of the holding means into a clamping position about an axis $A_H$ directed substantially in or parallel to the transport plane E and transversely to the transport direction T;
  wherein the crab thus fixed is transported further into the region of at least one processing station;
  characterised in that the holding means before reaching a final clamping position, in which the holding means are, however, lower than the shell of the crab, are moved towards each other transversely to the transport direction T underneath the shell until the holding elements rest on a body mass of the crab on both sides in the region of the shoulder joints, before the holding means are then lowered completely into the final clamping position about the axis $A_H$.

22. The method according to claim 21, wherein the method is carried out with an apparatus according to claim 1.

23. The method according to claim 22, wherein the crab is pushed into a gap formed between holding means located in the receiving position and supporting plate, in such a manner that the crab lies with its bone plate on the supporting plate and with its shell above the holding means, wherein the crab with its body mass pushes open spring-loaded holding means transversely to the transport direction T about an axis $A_V$ which in the clamping position is directed substantially vertically to the transport plane E, such that, even before final fixing, the crab is centred and fixed laterally by the holding means before said holding means are pivoted towards the supporting plate into the final clamping position.

24. The method according to claim 22, wherein both the supporting plate and the holding means in the loading station are pivoted during loading from a clamping position into a receiving position relative to the conveying element about the axis $A_{H1}$ directed in or parallel to the transport plane and transversely to the transport direction T to form a sufficiently large gap, wherein the supporting plate is additionally pivoted relative to the holding means about an axis $A_{H2}$, which is oriented parallel to the axis $A_{H1}$, to enlarge the gap.

25. The method according to claim 22, wherein the holding means, on leaving the loading station at the latest, are necessarily pulled into the final clamping position by spring force and/or a control curve, as a result of which the holding means together with the supporting plate are pushed around the axes $A_{H1}$ and $A_{H2}$ in the direction of the conveying element, while the holding means are pushed towards each other by means of spring force about the axis $A_V$ in the direction of the crab.

26. The method according to claim 22, wherein the crab is released from the holding apparatus after the last processing station.

27. The method according to claim 22, wherein the holding means are held laterally, at least in the region of the or each processing station, by means for holding the holding means in a closing position.

* * * * *

UNITED STATES PATENT AND TRADEMARK OFFICE
CERTIFICATE OF CORRECTION

PATENT NO.         : 11,497,220 B2
APPLICATION NO.    : 17/189360
DATED              : November 15, 2022
INVENTOR(S)        : Clinton R Smith and Tyler Santoro Page 1 of 1

It is certified that error appears in the above-identified patent and that said Letters Patent is hereby corrected as shown below:

On the Title Page

Item (73), delete the assignee "Baader North America Corporation" and replace it with -- Nordischer Maschinenbau Rud. Baader GmbH & Co. KG. --;

In the Claims

In Claim 23, dependent from Claim "22"; should claim dependency from -- Claim 21 --;

In Claim 24, dependent from Claim "22"; should claim dependency from -- Claim 21 --;

In Claim 25, dependent from Claim "22"; should claim dependency from -- Claim 21 --;

In Claim 26, dependent from Claim "22"; should claim dependency from -- Claim 21 --;

In Claim 27, dependent from Claim "22"; should claim dependency from -- Claim 21 --.

Signed and Sealed this
Eighteenth Day of July, 2023

Katherine Kelly Vidal
*Director of the United States Patent and Trademark Office*